UNITED STATES PATENT OFFICE.

ARTHUR T. WOODWARD, OF BOSTON, MASSACHUSETTS.

PLASTIC COMPOUND FOR USE IN VARIOUS ARTS.

SPECIFICATION forming part of Letters Patent No. 403,631, dated May 21, 1889.

Application filed January 22, 1887. Serial No. 225,168. (No specimens.)

*To all whom it may concern:*

Be it known that I, ARTHUR T. WOODWARD, of Boston, in the county of Suffolk and State of Massachusetts, have invented certain new and useful Improvements in Plastic Compounds for Use in Various Arts, of which the following is a full, clear, and exact description.

This invention relates to a plastic compound impervious to water and suitable for various uses in the arts, such as forming an insulating-bed for underground and submarine telegraph-wires, insulators for electrical conductors supported in the air, bearings for journals, and protecting-coating for metallic surfaces, such as ships' bottoms and other articles exposed to the action of salt-water.

It consists in a mechanical compound composed of a silica or a silicate and either a vegetable or mineral resin or pitch—such as colophony or asphaltum—both separately pulverized to impalpable powder, intimately mixed, and subjected to heat sufficient to melt the resin, which then coats each of the atoms of silica or silicate and causes them to adhere together when cooled, so as to form a mass of exceeding hardness and great density entirely impervious to water, possessed of remarkable insulating properties with respect to electricity, and capable of resisting the action of saline solutions. It is this latter property which gives it great utility as a protecting-coating for the bottom of ships, where it prevents the formation of barnacles and that corrosion which usually takes place around the sheathing-nails. Both the silica or silicate and resin or pitch are electric insulators, and their mixture produces a material easily molded and applied wherever desired. To the two substances above named and thoroughly mixed is to be added either oxide of lead or zinc, wax—such as paraffine, beeswax, or spermaceti—and boiled or raw linseed-oil or other suitable drying-oil, and, preferably, a slight admixture of turpentine or benzine. The oxide of lead or zinc gives flexibility and pliability to the compound. The wax combines very intimately with the oil and resin or pitch and aids in the intimate union of the same with the silica or silicate and causes the compound to set rapidly, and also reduces the quantity of oil necessary and again increases the durability, tenacity, flexibility, and water-proof and insulating character of the composition, and the turpentine or benzine facilitates the solubility of the resin or pitch and serves to bring the mass to a more fluent condition when it is desired to mold the same into articles of small size.

The compound of this invention is of great strength, durability, flexibility, and pliability, the two latter qualities being insured to a high degree by the oxide of lead or zinc, and when the compound has become thoroughly set and cooled the articles into which it is formed may be used without metallic supports. The compound may be molded in any of the ordinary forms of molds used for molding heated plastic materials or metals, and may also be molded in wooden or sand molds.

The proportions of the materials which I prefer to employ are approximately as follows: To one hundred pounds of the powdered silica or silicate—such as glass—fifty pounds of the mineral or vegetable resin or pitch, one hundred and fifty ounces of the oxide of lead or zinc, and the same of the animal or vegetable wax, and seventy-five ounces of the boiled linseed-oil, and a slight addition of turpentine or benzine or other suitable drying-oil.

The ingredients may be reduced to a fluid state in an ordinary caldron, such as is used in boiling pitch and paving or roofing composition.

It is quite important that the silica or silicate and resin or pitch shall be pulverized separately, as they can thus be thoroughly reduced to impalpable powder, which would be impossible were they attempted to be powdered together. In the latter case the compound would not be reliable, owing to the great liability of flakes or lamina of the resin or pitch being formed, which would result in globules of this material containing no silica or silicate in the mass after cooling.

Having thus described my invention, what I claim, and desire to secure by Letters Patent, is—

The plastic compound herein described, the same being composed of pulverized silica or silicate, mineral or vegetable resin or pitch intimately mixed therewith, mineral or vegetable wax, linseed or other drying oil, and an oxide of zinc or tin, substantially as described, for the purposes specified.

In testimony whereof I have hereunto set my hand in the presence of two subscribing witnesses.

ARTHUR T. WOODWARD.

Witnesses:
    ALBERT W. BROWN,
    FRANCES M. BROWN.